(12) United States Patent
Yang et al.

(10) Patent No.: US 9,513,488 B2
(45) Date of Patent: Dec. 6, 2016

(54) STEREOSCOPIC DISPLAY DEVICE

(71) Applicant: Shenzhen China Star Optoelectronics Technology Co., Ltd., Guangdong (CN)

(72) Inventors: Chihming Yang, Guangdong (CN);
Deyong Fan, Guangdong (CN);
Changchengmr Lo, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 268 days.

(21) Appl. No.: 14/130,332

(22) PCT Filed: Dec. 23, 2013

(86) PCT No.: PCT/CN2013/090210
§ 371 (c)(1),
(2) Date: Dec. 31, 2013

(87) PCT Pub. No.: WO2015/081591
PCT Pub. Date: Jun. 11, 2015

(65) Prior Publication Data
US 2015/0161939 A1    Jun. 11, 2015

(30) Foreign Application Priority Data
Dec. 6, 2013  (CN) .......................... 2013 1 0654969

(51) Int. Cl.
*G02B 27/22* (2006.01)
*G02F 1/1343* (2006.01)
(Continued)

(52) U.S. Cl.
CPC ......... *G02B 27/2214* (2013.01); *G02B 27/225* (2013.01); *G02B 27/2228* (2013.01);
(Continued)

(58) Field of Classification Search
CPC ............ G09G 3/325; G09G 2300/0439; G09G 2300/0404; G09G 5/00; G02B 27/2214; G02B 27/2228; G02B 27/225; G02F 1/134336
See application file for complete search history.

(56) References Cited

U.S. PATENT DOCUMENTS

2005/0117103 A1   6/2005  Son
2005/0259207 A1*  11/2005 Yang ................. G02F 1/134363
                                                             349/141
(Continued)

FOREIGN PATENT DOCUMENTS

CN        1624547     6/2005
CN        2769932     4/2006
(Continued)

*Primary Examiner* — Dung Nguyen

(57) ABSTRACT

A stereoscopic display device is disclosed, and it includes a substrate, plural rows of pixel regions, and a patterned retarder film. Each pixel region includes plural pixel units. Each pixel unit includes a first electrode and a second electrode. The pixel regions are divided into plural groups. Each group includes N rows of the pixel regions. The first electrode of each pixel unit in first N/2 rows of the pixel regions is in a form of one of a "〈" shape and a "〉" shape, and the first electrode of each pixel unit in last N/2 rows of the pixel regions is in a form of the other one of the "〈" shape and the "〉" shape. The present invention can solve the problems of the color shift phenomenon and the inconsistent brightness.

7 Claims, 4 Drawing Sheets

(51) Int. Cl.
  *H04N 13/04* (2006.01)
  *G09G 5/00* (2006.01)
  *G09G 3/00* (2006.01)
  *G09G 3/36* (2006.01)
  *G02F 1/13363* (2006.01)

(52) U.S. Cl.
  CPC ... *G02F 1/134336* (2013.01); *H04N 13/0434* (2013.01); *G02F 2001/133631* (2013.01); *G02F 2001/134372* (2013.01); *G09G 3/003* (2013.01); *G09G 3/36* (2013.01); *G09G 5/00* (2013.01); *G09G 2300/0426* (2013.01); *G09G 2300/0439* (2013.01); *G09G 2320/028* (2013.01); *G09G 2320/0233* (2013.01); *G09G 2320/0242* (2013.01)

(56) References Cited

U.S. PATENT DOCUMENTS

| | | | |
|---|---|---|---|
| 2010/0013912 A1 | 1/2010 | Lee et al. | |
| 2013/0120680 A1 | 5/2013 | Sun | |
| 2013/0321721 A1 | 12/2013 | Jin et al. | |
| 2014/0009703 A1* | 1/2014 | Park | G02F 1/1313 |
| | | | 349/15 |

FOREIGN PATENT DOCUMENTS

| | | |
|---|---|---|
| CN | 101630068 | 1/2010 |
| CN | 102629056 | 8/2012 |
| CN | 103185993 A * | 7/2013 |

* cited by examiner

STEREOSCOPIC DISPLAY DEVICE

RELATED APPLICATIONS

This application is a National Phase of PCT Patent Application No. PCT/CN2013/090210 having International filing date of Dec. 23, 2013, which claims the benefit of priority of Chinese Patent Application No. 201310654969.6 filed on Dec. 6, 2013. The contents of the above applications are all incorporated by reference as if fully set forth herein in their entirety.

BACKGROUND OF THE INVENTION

1. Field of the Invention

The present invention generally relates to a display device, and more particularly to a stereoscopic display device.

2. Description of Prior Art

With the development of liquid crystal display devices, stereoscopic display devices (3D display devices) capable of displaying stereoscopic images have entered the market gradually and become a development direction of the liquid crystal display devices in the next generation.

Please refer to FIG. 1. FIG. 1 illustrates an operational principle of a conventional stereoscopic display device. The conventional stereoscopic display device in FIG. 1 adopts patterned retarder technology, and it displays stereoscopic images in conjunction with polarized glasses 14.

As shown in FIG. 1, a linear polarizer 10 is disposed at one side of a thin film transistor (TFT) array substrate (not shown) of the stereoscopic display device, and a λ/4 wave plate array 12 is disposed at one side of a color filter (CF) substrate (not shown). Light which is generated from a backlight module (not shown) of the stereoscopic display device and passes through the linear polarizer 10 is polarized into linearly polarized light. An angle between an optical axis of the linear polarizer 10 and a horizontal direction H is 90 degrees. Accordingly, only light having a polarizing direction in a vertical direction can pass through the linear polarizer 10. That is, the light passing through the linear polarizer 10 becomes vertical polarized light.

Angles between a direction of an optical axis of the λ/4 wave plate array 12 and the horizontal direction H comprise 45 degrees and 135 degrees. The two directions of the optical axis are alternately arranged along the vertical direction as shown in FIG. 1. Accordingly, after the vertical polarized light from the linear polarizer 10 passes through the λ/4 wave plate array 12, right-hand circularly polarized light and left-hand circularly polarized light are generated at the same time.

The polarized glasses 14 in conjunction with the stereoscopic display device comprise λ/4 wave plates 140 and 142 and vertical polarizers 144 and 146. The λ/4 wave plate 140 is adhered to the vertical polarizer 144 for serving as a left eye glass, and the λ/4 wave plate 142 is adhered to the vertical polarizer 146 for serving as a right eye glass. A direction of an optical axis of the λ/4 wave plate 140 is 45 degrees. A direction of an optical axis of the λ/4 wave plate 142 is 135 degrees. A direction of an optical axis of the vertical polarizer 144 and a direction of an optical axis of the vertical polarizer 146 are perpendicular to the horizontal direction H. The left-hand circularly polarized light from the λ/4 wave plate array 12 can pass through the right eye glass and enter a right eye of an observer, and the left-hand circularly polarized light is absorbed by the left eye glass and does not enter a left eye of the observer. The right-hand circularly polarized light from the λ/4 wave plate array 12 can pass through the left eye glass and enter the left eye of the observer, and the right-hand circularly polarized light is absorbed by the right eye glass and does not enter the right eye of the observer.

Accordingly, when right eye images for the right eye of the observer and left eye images for the left eye of the observer are arranged corresponding to 45 degrees and 135 degrees of the directions of the optical axis of the λ/4 wave plate array 12, the right eye images can be viewed by only the right eye of the observer and the left eye images can be viewed by only the left eye of the observer, thereby 3D effect can be perceived by the observer.

Please refer to FIG. 2. FIG. 2 illustrates a pixel structure of the conventional stereoscopic display device and a patterned retarder film (or called as a film-type patterned retarder, i.e. FPR) 20. A top view is shown in the left of a dotted line, and a side view is shown in the right of the dotted line. FIG. 2 is an in-plane switching (IPS) stereoscopic display device or a fringe field switching (FFS) stereoscopic display device. The patterned retarder film 20 in FIG. 2 functions the same as the λ/4 wave plate array 12 in FIG. 1. That is, when linearly polarized light passes through the patterned retarder film 20, left-hand circularly polarized light and right-hand circularly polarized light are generated. Then, the left-hand circularly polarized light and the right-hand circularly polarized light pass through the polarized glasses 14 in FIG. 1, so that the observer can perceive 3D effect. The pixel structure in FIG. 2 comprises a right pixel region 22 and a left pixel region 24. Each of the right pixel region 22 and the left pixel region 24 is divided into two domains d1 and d2. If each of the right pixel region 22 and the left pixel region 24 has only one domain, color shift phenomenon with a shade of yellow or purple occurs. As a result, an objective of dividing each of the right pixel region 22 and the left pixel region 24 into two domains d1 and d2 is to cancel the color shift phenomenon in a wide angle.

However, the above-mentioned design of the two domains d1 and d2 affects display effect in a vertical viewing angle. The domain d1 is observed from an upward viewing angle 26, and the domain d2 is observed from a downward viewing angle 28. Because liquid crystals in the domain d1 and liquid crystals in the domain d2 have different orientation directions, the problems of the color shift phenomenon and inconsistent brightness between the upward viewing angle 26 and the downward viewing angle 28 occur.

Consequently, there is a need to solve the problems of the color shift phenomenon and the inconsistent brightness due to the above-mentioned design of the two domains in the prior arts.

SUMMARY OF THE INVENTION

An objective of the present invention is to provide a stereoscopic display device capable of solving the problems of the color shift phenomenon and the inconsistent brightness in the prior arts.

To solve the above-mentioned problem, a stereoscopic display device provided by the present invention comprises a substrate, a plurality of rows of pixel regions, and a patterned retarder film. The pixel regions are disposed on the substrate. Each of the pixel regions comprises a plurality of pixel units. Each of the pixel units comprises a first electrode and a second electrode. The patterned retarder film is disposed on the pixel regions. The patterned retarder film comprises a plurality of λ/4 films and a plurality of −λ/4 films which are alternately arranged corresponding to each of the pixel regions in sequence. The pixel regions are divided into a plurality of groups. Each group comprises N rows of the pixel regions. The first electrode of each of the pixel units in first N/2 rows of the pixel regions of each group is in a form of one of a "⟨" shape and a "⟩" shape, and the first electrode of each of the pixel units in last N/2 rows of the pixel regions of each group is in a form of the other one of the "⟨" shape and the "⟩" shape different from the form of the first electrode of each of the pixel units in the first N/2 rows of the pixel regions. N is a positive even number greater than or equal to 4.

In the stereoscopic display device of the present invention, the second electrode of each of the pixel units is in a flat shape and disposed below the first electrode.

In the stereoscopic display device of the present invention, the first electrode of each of the pixel units comprises a plurality of curved strip-shaped electrodes.

In the stereoscopic display device of the present invention, each of the pixel units is one of a red sub-pixel, a green sub-pixel, and a blue sub-pixel.

To solve the above-mentioned problem, a stereoscopic display device provided by the present invention comprises a substrate, a plurality of rows of pixel regions, and a patterned retarder film. The pixel regions are disposed on the substrate. Each of the pixel regions comprises a plurality of pixel units. Each of the pixel units comprises a first electrode and a second electrode. The patterned retarder film is disposed on the pixel regions. The pixel regions are divided into a plurality of groups. Each group comprises N rows of the pixel regions. The first electrode of each of the pixel units in first N/2 rows of the pixel regions of each group is in a form of one of a "⟨" shape and a "⟩" shape, and the first electrode of each of the pixel units in last N/2 rows of the pixel regions of each group is in a form of the other one of the "⟨" shape and the "⟩" shape different from the form of the first electrode of each of the pixel units in the first N/2 rows of the pixel regions. N is a positive even number greater than or equal to 4.

In the stereoscopic display device of the present invention, the patterned retarder film comprises a plurality of $\lambda/4$ films and a plurality of $-\lambda/4$ films which are alternately arranged.

In the stereoscopic display device of the present invention, the second electrode of each of the pixel units is in a flat shape and disposed below the first electrode.

In the stereoscopic display device of the present invention, the first electrode of each of the pixel units comprises a plurality of curved strip-shaped electrodes.

In the stereoscopic display device of the present invention, each of the pixel units is one of a red sub-pixel, a green sub-pixel, and a blue sub-pixel.

To solve the above-mentioned problem, a stereoscopic display device provided by the present invention comprises a substrate, a plurality of rows of pixel regions, and a patterned retarder film. The pixel regions are disposed on the substrate. Each of the pixel regions comprises a plurality of pixel units. Each of the pixel units comprises a first electrode and a second electrode. The patterned retarder film is disposed on the pixel regions. The first electrode of each of the pixel units in each of the pixel regions is in a form of N "⟨" shapes connected in series or in a form of N "⟩" shapes connected in series. N is a positive even number greater than or equal to 2.

In the stereoscopic display device of the present invention, the patterned retarder film comprises a plurality of $\lambda/4$ films and a plurality of $-\lambda/4$ films which are alternately arranged.

In the stereoscopic display device of the present invention, the second electrode of each of the pixel units is in a flat shape and disposed below the first electrode.

In the stereoscopic display device of the present invention, the first electrode of each of the pixel units comprises a plurality of curved strip-shaped electrodes.

In the stereoscopic display device of the present invention, each of the pixel units is one of a red sub-pixel, a green sub-pixel, and a blue sub-pixel.

Compared with the prior arts, the stereoscopic display device of the present invention is capable of solving the problems of the color shift phenomenon and the inconsistent brightness in the prior arts.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures.

Figure 1:
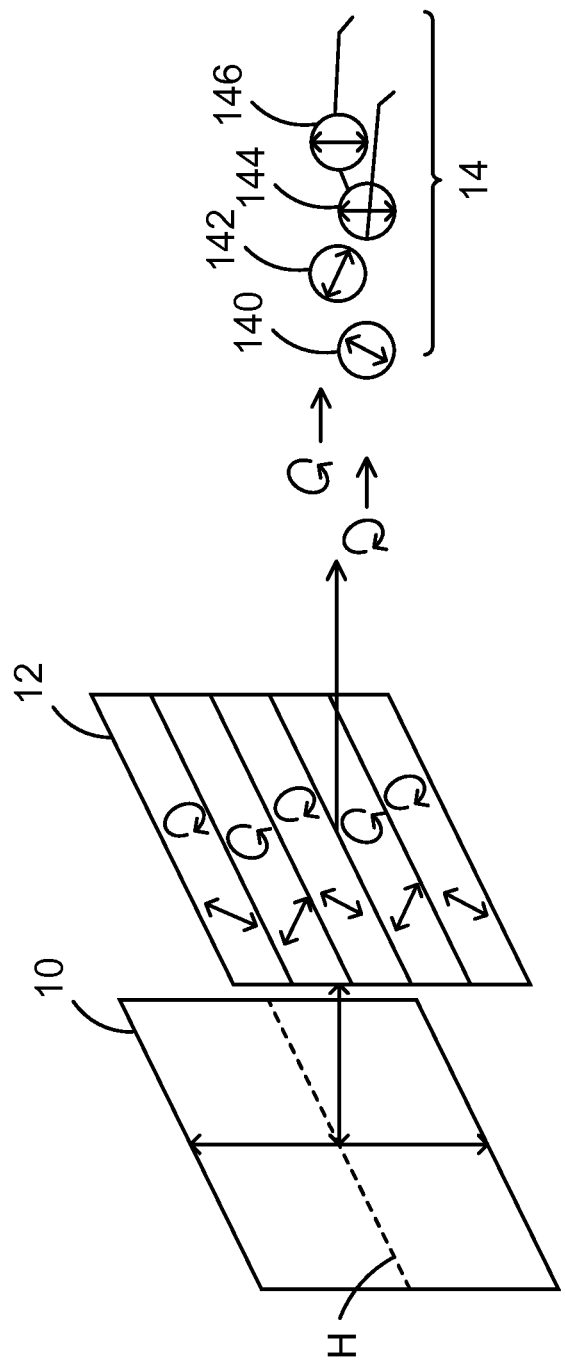
FIG. 1 illustrates an operational principle of a conventional stereoscopic display device.
Figure 2:
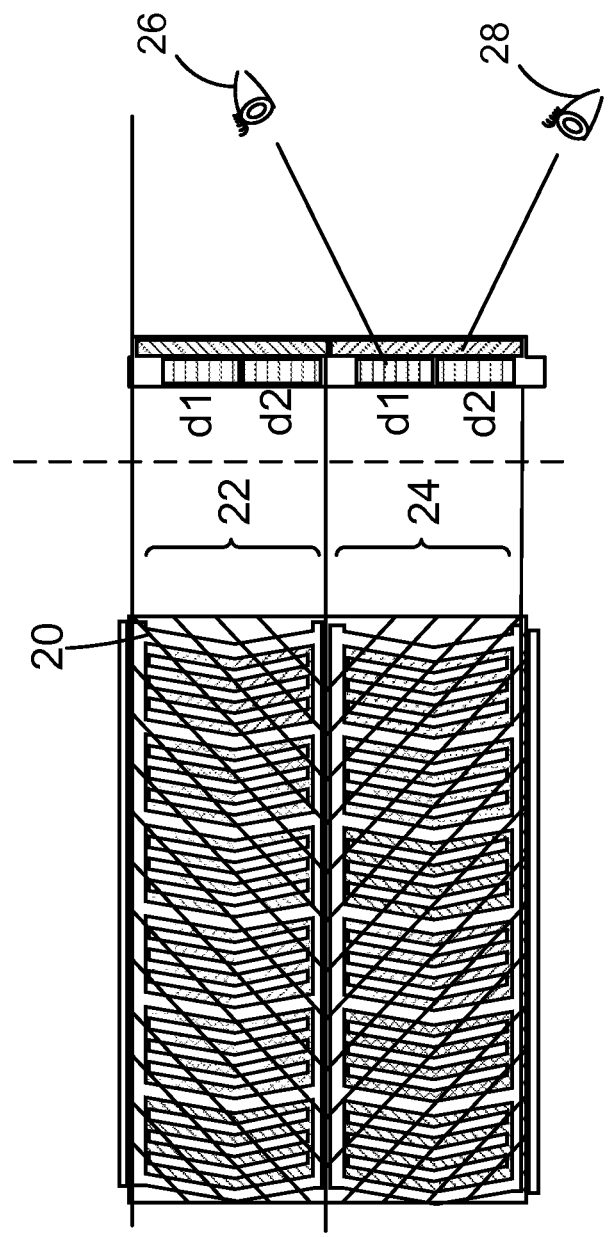
FIG. 2 illustrates a pixel structure of the conventional stereoscopic display device and a patterned retarder film.
Figure 3:
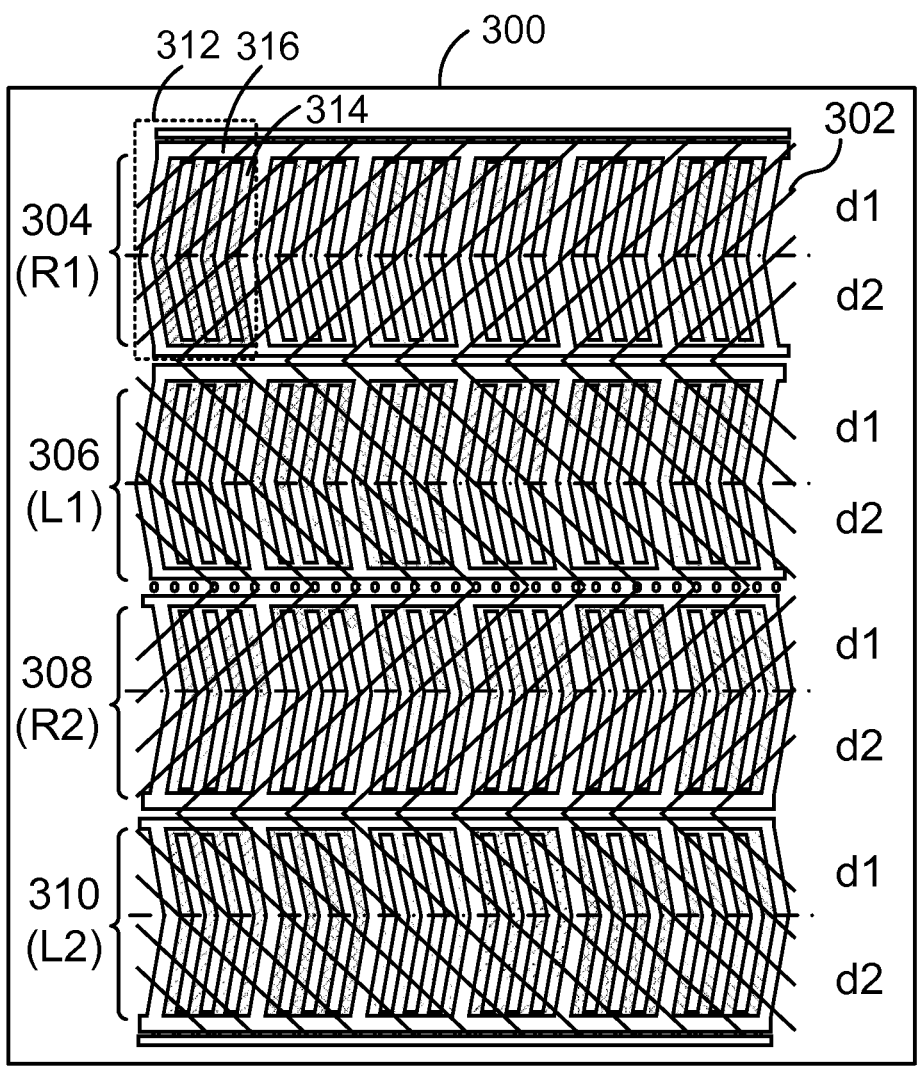
FIG. 3 illustrates a stereoscopic display device in accordance with a first embodiment of the present invention.

Please refer to FIG. 3. FIG. 3 illustrates a stereoscopic display device 30 in accordance with a first embodiment of the present invention. The stereoscopic display device 30 comprises a substrate 300, a patterned retarder film 302, and a plurality of rows of pixel regions. There are four pixel regions 304, 306, 308, and 310 disposed on the substrate 300 in FIG. 3. The substrate 300, for example, is a thin film transistor (TFT) array substrate. The patterned retarder film 302 is disposed on the pixel regions 304, 306, 308, and 310 and comprises a plurality of $\lambda/4$ films and a plurality of $-\lambda/4$ films which are alternately and vertically arranged. As shown in FIG. 3, a form of a "I" shape and a form of a "\" shape are alternately and vertically arranged corresponding to the pixel regions 304, 306, 308, and 310 in sequence.

Each of the pixel regions 304, 306, 308, and 310 comprises a plurality of pixel units 312. Each of the pixel units 312 comprises a first electrode 314 and a second electrode 316. Each first electrode 314 comprises a plurality of curved strip-shaped electrodes and serves as a pixel electrode. The second electrode 316 is formed in a flat shape and serves as a common electrode. The second electrode 316 may be disposed below the first electrodes 314. An insulation layer (not shown) is formed between the first electrodes 314 and the second electrode 316.

Each of the pixel units 312 may be one of a red sub-pixel, a green sub-pixel, and a blue sub-pixel.

A feature of the present embodiment is that the pixel regions are divided into a plurality of groups, and each group comprises four rows of the pixel regions. The first electrode of each of the pixel units in first two rows of the pixel regions of each group is in a form of a "⟨" shape, and the first electrode of each of the pixel units in last two rows of the pixel regions of each group is in a form of a "⟩" shape. That is, the first electrode of each of the pixel units in the first two rows of the pixel regions of each group is curved toward a first direction, and the first electrode of each of the pixel units in the last two rows of the pixel regions of each group is curved toward a second direction. The first direction and the second direction are opposite directions.

In FIG. 3, the first electrode 314 of each of the pixel units 312 in the pixel regions 304 and 306 (i.e. the first two rows of the pixel regions of each group) is in the form of the "⟨" shape, and the first electrode 314 of each of the pixel units 312 in the pixel regions 308 and 310 (i.e. the last two rows of the pixel regions of each group) is in the form of the "⟩" shape.

In other words, the first electrode 314 of each of the pixel units 312 in the pixel regions 304 and 306 (i.e. the first two rows of the pixel regions of each group) is curved toward the left, and the first electrode 314 of each of the pixel units 312 in the pixel regions 308 and 310 (i.e. the last two rows of the pixel regions of each group) is curved toward the right.

It is noted that FIG. 3 illustrates only one group (i.e. four rows) of pixel regions. An arrangement of the first electrodes in the pixel regions of other groups is the same as that of the pixel regions 304, 306, 308, and 310 and thus omitted herein.

Since the first electrode 314 of each of the pixel units 312 in the pixel regions 304, 306, 308, and 310 is in the form of the "⟨" shape or in the form of the "⟩" shape (i.e. curved), the first electrode 314 of each of the pixel units 312 in the pixel regions 304, 306, 308, and 310 is divided into two domains d1 and d2.

When the stereoscopic display device 30 displays a stereoscopic image, the pixel regions 304 and 308 are viewed by a right eye and the pixel regions 306 and 310 are viewed by a left eye. As a result, the domain d1 of each first electrode 314 in the pixel region 304 and the domain d2 of each first electrode 314 in the pixel region 308 are viewed by the right eye from an upward viewing angle, and the domain d1 of each first electrode 314 in the pixel region 306 and the domain d2 of each first electrode 314 in the pixel region 310 are viewed by the left eye from the upward viewing angle.

In another aspect, the domain d2 of each first electrode 314 in the pixel region 304 and the domain d1 of each first electrode 314 in the pixel region 308 are viewed by the right eye from a downward viewing angle, and the domain d2 of each first electrode 314 in the pixel region 306 and the domain d1 of each first electrode 314 in the pixel region 310 are viewed by the left eye from the downward viewing angle.

In summary, the domains d1 and d2 are uniformly distributed when being viewed from the upward viewing angle, and the domains d2 and d1 are uniformly distributed when being viewed from the downward viewing angle. As a result, the arrangement of the first electrodes 314 not only increases a viewing angle but also solves the problems of the color shift phenomenon and the inconsistent brightness between the upward viewing angle and the downward viewing angle in the prior arts.

Furthermore, in another embodiment, the first electrode 314 of each of the pixel units 312 in the pixel regions 304 and 306 (i.e. the first two rows of the pixel regions of each group) may be in the form of the "⟩" shape, and the first electrode 314 of each of the pixel units 312 in the pixel regions 308 and 310 (i.e. the last two rows of the pixel regions of each group) may be in the form of the "⟨" shape. Such an arrangement can have the same effect as that in FIG. 3.

Moreover, each group comprises four rows of the pixel regions in the embodiment of FIG. 3. According to the concept in the embodiment of FIG. 3, the pixel regions of the present invention may be divided into a plurality of groups, and each group comprises N rows of the pixel regions. The first electrode of each of the pixel units in first N/2 rows of the pixel regions of each group (i.e. a first row to a (N/2)th row of the pixel regions of each group) is in a form of one of a "⟨" shape and a "⟩" shape, and the first electrode of each of the pixel units in last N/2 rows of the pixel regions of each group (i.e. a (N/2+1)th row to an Nth row of the pixel regions of each group) is in a form of the other one of the "⟨" shape and the "⟩" shape different from the form of the first electrode of each of the pixel units in the first N/2 rows of the pixel regions of each group. N is a positive even number greater than or equal to 4.

Figure 4:
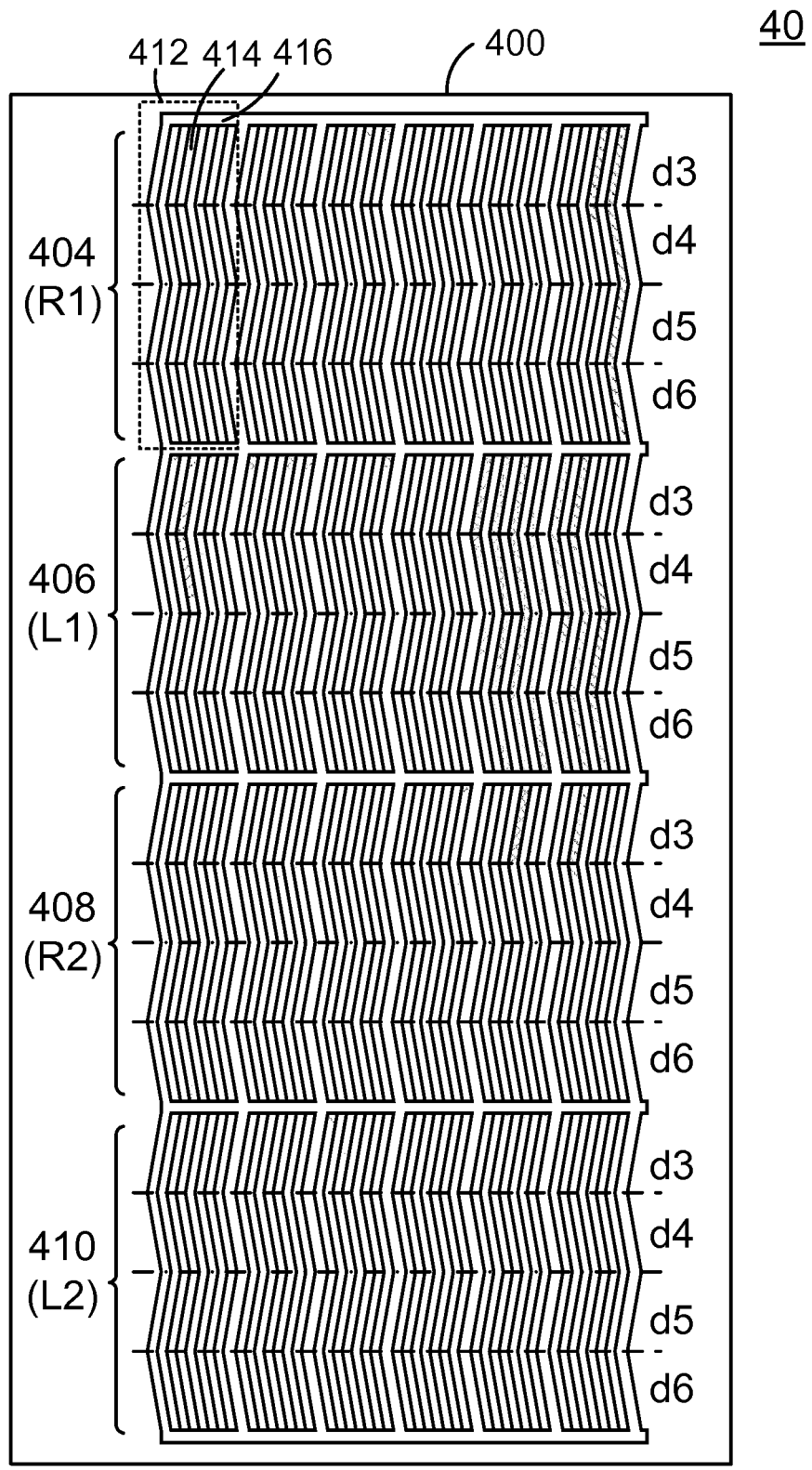
FIG. 4 illustrates a stereoscopic display device in accordance with a second embodiment of the present invention.

Please refer to FIG. 4. FIG. 4 illustrates a stereoscopic display device 40 in accordance with a second embodiment of the present invention. The stereoscopic display device 40 comprises a substrate 400, a patterned retarder film (now shown), and a plurality of rows of pixel regions. For the sake of simplicity and clearness, the patterned retarder film is not shown in FIG. 4. The patterned retarder film can be reference to the patterned retarder film 302 in FIG. 3. The same as the patterned retarder film 302 in FIG. 3, the patterned retarder film of the present embodiment comprises a plurality of λ/4 films and a plurality of −λ/4 films which are alternately arranged, and the patterned retarder film is in a form of a "/" shape and a form of a "\" shape which are alternately and vertically arranged corresponding to pixel regions 404, 406, 408, and 410 in sequence as shown in FIG. 3.

The substrate 400, for example, is a thin film transistor (TFT) array substrate. There are four pixel regions 404, 406, 408, and 410 in FIG. 4. Each of the pixel regions 404, 406, 408, and 410 comprises a plurality of pixel units 412. Each of the pixel units 412 comprises a first electrode 414 and a second electrode 416. Each first electrode 414 comprises a plurality of curved strip-shaped electrodes and serves as a pixel electrode. The second electrode 416 is formed in a flat shape and serves as a common electrode. The second electrode 416 may be disposed below the first electrodes 414. An insulation layer (not shown) is formed between the first electrodes 414 and the second electrode 416.

Each of the pixel units 412 may be one of a red sub-pixel, a green sub-pixel, and a blue sub-pixel.

A feature of the present embodiment is that the first electrode 414 of each of the pixel units 412 in each of the pixel regions 404, 406, 408, and 410 is in a form of N "⟨" shapes connected in series. N is a positive even number greater than or equal to 2. More particularly, the first electrode 414 of each of the pixel units 412 in the pixel regions 404, 406, 408, and 410 comprises at least two wires which are curved toward the left and connected in series. That is, the two wires are curved toward the same direction (left).

Since the first electrode 414 of each of the pixel units 412 in the pixel regions 404, 406, 408, and 410 is in the form of 2 "⟨" shapes connected in series, the first electrode 414 of each of the pixel unit 412 in the pixel regions 404, 406, 408, and 410 is divided into four domains d3, d4, d5, and d6.

When the stereoscopic display device 40 displays a stereoscopic image, the pixel regions 404 and 408 are viewed by a right eye and the pixel regions 406 and 410 are viewed by a left eye. As a result, the domains d3 and d4 of each first electrode 414 in the pixel region 404 and the domains d3 and d4 of each first electrode 414 in the pixel region 408 are viewed by the right eye from an upward viewing angle, and the domains d3 and d4 of each first electrode 414 in the pixel region 406 and the domains d3 and d4 of each first electrode 414 in the pixel region 410 are viewed by the left eye from the upward viewing angle.

In another aspect, the domains d6 and d5 of each first electrode 414 in the pixel region 404 and the domains d6 and d5 of each first electrode 414 in the pixel region 408 are viewed by the right eye from a downward viewing angle, and the domains d6 and d5 of each first electrode 414 in the pixel region 406 and the domains d6 and d5 of each first electrode 414 in the pixel region 410 are viewed by the left eye from the downward viewing angle.

In summary, the domains d3 and d4 are uniformly distributed when being viewed from the upward viewing angle, and the domains d6 and d5 are uniformly distributed when being viewed from the downward viewing angle. As a result, the arrangement of the first electrodes 414 not only increases a viewing angle but also solves the problems of the color shift phenomenon and the inconsistent brightness between the upward viewing angle and the downward viewing angle in the prior arts.

It is noted that the first electrode 414 of each of the pixel unit 412 is in the form of 2 "⟨" shapes connected in series in the embodiment of FIG. 4. In another embodiment, the first electrode 414 of each of the pixel units 412 is in the form of N "⟩" shapes connected in series. N is a positive even number greater than or equal to 2. More particularly, the first electrode 414 of each of the pixel units 412 in the pixel regions 404, 406, 408 and 410 comprises at least two wires which are curved toward the right and connected in series. That is, the two wires are curved toward the same direction (right).

Furthermore, each of the stereoscopic display device 30 in FIG. 3 and the stereoscopic display device 40 in FIG. 4 in accordance with the present invention is an in-plane switching (IPS) stereoscopic display device or a fringe field switching (FFS) stereoscopic display device.

Finally, it is noted that each of the stereoscopic display device 30 in FIG. 3 and the stereoscopic display device 40 in FIG. 4 further comprises a plurality of scan lines, a plurality of data lines, and a plurality of thin film transistors, and the arrangement thereof is known by one skilled in the art of the present invention and omitted herein.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A stereoscopic display device, comprising:
   a substrate;
   a plurality of rows of pixel regions disposed on the substrate, each of the pixel regions comprising a plurality of pixel units, each of the pixel units comprising a first electrode and a second electrode; and
   a patterned retarder film disposed on the pixel regions, the patterned retarder film comprising a plurality of λ/4 films and a plurality of –λ/4 films which are alternately arranged corresponding to each of the pixel regions in sequence,
   wherein the pixel regions are divided into a plurality of groups, each group comprises N rows of the pixel regions, the first electrode of each of the pixel units in first N/2 rows of the pixel regions of each group is in a form of one of a "⟨" shape and a "⟩" shape, the first electrode of each of the pixel units in last N/2 rows of the pixel regions of each group is in a form of the other one of the "⟨" shape and the "⟩" shape different from the form of the first electrode of each of the pixel units in the first N/2 rows of the pixel regions, and N is a positive even number greater than or equal to 4.

2. The stereoscopic display device of claim 1, wherein the second electrode of each of the pixel units is in a flat shape and disposed below the first electrode.

3. The stereoscopic display device of claim 1, wherein the first electrode of each of the pixel units comprises a plurality of curved strip-shaped electrodes.

4. A stereoscopic display device, comprising:
   a substrate;
   a plurality of rows of pixel regions disposed on the substrate, each of the pixel regions comprising a plurality of pixel units, each of the pixel units comprising a first electrode and a second electrode; and
   a patterned retarder film disposed on the pixel regions,
   wherein the pixel regions are divided into a plurality of groups, each group comprises N rows of the pixel regions, the first electrode of each of the pixel units in first N/2 rows of the pixel regions of each group is in a form of one of a "⟨" shape and a "⟩" shape, the first electrode of each of the pixel units in last N/2 rows of the pixel regions of each group is in a form of the other one of the "⟨" shape and the "⟩" shape different from the form of the first electrode of each of the pixel units in the first N/2 rows of the pixel regions, and N is a positive even number greater than or equal to 4.

5. The stereoscopic display device of claim 4, wherein the patterned retarder film comprises a plurality of λ/4 films and a plurality of –λ/4 films which are alternately arranged.

6. The stereoscopic display device of claim 4, wherein the second electrode of each of the pixel units is in a flat shape and disposed below the first electrode.

7. The stereoscopic display device of claim 4, wherein the first electrode of each of the pixel units comprises a plurality of curved strip-shaped electrodes.

* * * * *